United States Patent
Boss et al.

(10) Patent No.: US 11,665,244 B2
(45) Date of Patent: May 30, 2023

(54) SELECTING USER PROFILES ON PLATFORMS BASED ON OPTIMAL PERSONA OF A USER IN A GIVEN CONTEXT

(71) Applicant: KYNDRYL, INC., New York, NY (US)

(72) Inventors: Gregory J. Boss, Saginaw, MI (US); Charles Steven Lingafelt, Durham, NC (US); John E. Moore, Jr., Pflugerville, TX (US); Andrew R. Jones, Round Rock, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/508,684

(22) Filed: Jul. 11, 2019

(65) Prior Publication Data

US 2021/0014327 A1    Jan. 14, 2021

(51) Int. Cl.
*H04L 67/306* (2022.01)
*G06N 3/08* (2023.01)
*H04L 67/561* (2022.01)
*H04L 67/5682* (2022.01)
*G06Q 50/00* (2012.01)

(52) U.S. Cl.
CPC ............ *H04L 67/306* (2013.01); *G06N 3/08* (2013.01); *H04L 67/561* (2022.05); *H04L 67/5682* (2022.05); *G06Q 50/01* (2013.01)

(58) Field of Classification Search
None
See application file for complete search history.

(56) References Cited

U.S. PATENT DOCUMENTS

| | | | |
|---|---|---|---|
| 6,512,525 B1 * | 1/2003 | Capps | G06F 9/44505 715/762 |
| 7,161,914 B2 | 1/2007 | Shoaib | |
| 8,370,062 B1 | 2/2013 | Starenky | |
| 8,504,718 B2 | 8/2013 | Wang | |
| 8,549,061 B2 | 10/2013 | Rao et al. | |
| 9,800,525 B1 * | 10/2017 | Lerner | H04L 51/36 |
| 10,171,472 B2 | 1/2019 | Furtado et al. | |
| 2003/0147624 A1 * | 8/2003 | Trajkovic | H04N 21/44218 386/326 |

(Continued)

OTHER PUBLICATIONS

Bartunov et al. "Joint link-attribute user identity resolution in online social networks." Proceedings of the 6th International Conference on Knowledge Discovery and Data Mining, Workshop on Social Network Mining and Analysis. ACM. 2012. (Background).

(Continued)

*Primary Examiner* — Mohamed A. Wasel
*Assistant Examiner* — Mohammad Yousuf A. Mian
(74) *Attorney, Agent, or Firm* — Tutunjian & Bitetto, P.C.; Dan Housley

(57) ABSTRACT

A system and method for selecting a user profile for use with a platform based on an optimal persona of the user includes inferring a context of a user based on data received from a plurality of data sources, determining a persona of the user according to the context of the user from a plurality of user personas, and selecting a user profile associated with a platform that corresponds to the persona, in response to detecting that the user is accessing the platform.

12 Claims, 11 Drawing Sheets

(56) References Cited

U.S. PATENT DOCUMENTS

| | | | | |
|---|---|---|---|---|
| 2010/0281427 | A1* | 11/2010 | Ghosh | H04W 4/18 |
| | | | | 715/811 |
| 2011/0126119 | A1 | 5/2011 | Young et al. | |
| 2012/0115453 | A1* | 5/2012 | Zheng | H04M 1/72569 |
| | | | | 455/418 |
| 2012/0131155 | A1 | 5/2012 | Madey et al. | |
| 2014/0157422 | A1* | 6/2014 | Livshits | G06F 21/6245 |
| | | | | 726/26 |
| 2014/0309806 | A1* | 10/2014 | Ricci | G06Q 10/20 |
| | | | | 701/1 |
| 2018/0285463 | A1* | 10/2018 | Choi | G06F 16/9535 |
| 2019/0197430 | A1* | 6/2019 | Arditi | G01C 21/3438 |

OTHER PUBLICATIONS

Perito et al. "How unique and traceable are usernames?." International Symposium on Privacy Enhancing Technologies Symposium. Springer, Berlin, Heidelberg, 2011. (Background).

Uhlmann et al.. "Personalization algorithms for portable personality." Proceedings of the 12th international conference on Entertainment and media in the ubiquitous era. ACM, 2008. (Related).

Sutterer et al., "User profile management on service platforms for ubiquitous computing environments." 2007 IEEE 65th Vehicular Technology Conference-VTC2007-Spring. IEEE, 2007. (Related).

Mell, Peter et al.; "The NIST Definition of Cloud Computing;" National Institute of Standards and Technology; Special Publication 800-145; Sep. 2011; 7 pages.

Gosh et al., I, Me and My Phone: Identity and Personalization using Mobile Devices, Digital Printing and Imaging Laboratory HP Laboratories Palo Alto HPL-2007-184 Nov. 8, 2007, 14 pages.

* cited by examiner

US 11,665,244 B2

SELECTING USER PROFILES ON PLATFORMS BASED ON OPTIMAL PERSONA OF A USER IN A GIVEN CONTEXT

TECHNICAL FIELD

The present invention relates to systems and methods for user profile selection based on a user persona, and more specifically to embodiments of a user profile selection system for selecting a user profile for use with a platform based on an optimal persona of the user.

BACKGROUND

Most platforms allow a user to create a user profile so that the platform is customized to the user. The user profile can be used to access the platform. Once the user profile or user identification is recognized by the platform, the user can perform actions on the platform under the user profile.

SUMMARY

An embodiment of the present invention relates to a method, and associated computer system and computer program product for selecting a user profile for use with a platform based on an optimal persona of the user. A processor of a computing system infers a context of a user based on data received from a plurality of data sources. A persona of the user is determined according to the context of the user from a plurality of user personas. A user profile associated with a platform is selected that corresponds to the persona, in response to detecting that the user is accessing the platform.

DETAILED DESCRIPTION

In brief overview, embodiments of user profile selection system 100 describes an intelligent system that selects an optimal persona from multiple available personas for use within a platform based on context. The context of the user is inferred from multiple different sources and the persona that is appropriate for the context is selected. Based on the optimal persona of the user in a given context, a user profile associated with the platform can be changed to match the optimal persona of the user. For example, the user profile selection system can detect that the user's "boss" just entered the user's car to travel to a client's headquarters, in which case the optimal persona of the user might be a work or professional persona. As the user starts the car, the car's infotainment system selects a user profile that corresponds to the user's work or professional persona. The selected user profile registered with the car's infotainment system is configured to tune a radio to a music channel that plays classical music and reduce the volume to a lower decibel level. Similarly, if the system detects that the user is alone when starting the car's engine, the car's infotainment system selects a user profile that corresponds to the user's default or genuine persona. The selected user profile registered with the car's infotainment system is configured to tune a radio to a music channel that plays rock music and increases the volume to a louder decibel level.

In another example, the system can detect that a user is at the user's office and if the user launches a social media platform on the user's mobile device, the system 100 automatically logs into the social media platform under a user profile associated with a work or professional persona. However, if the user leaves the office and begins the commute home, the system 100 recognizes the context change and automatically changes the user's profile on the social media platform to the user's personal account, which is associated with a default persona.

Accordingly, the system evaluate a user's context including location, company, time at location, responsibilities, actions, data consumed, environment, etc. in relation to the platform a user is currently using. The system determines an optimal persona for the context and selects the user profile associated with the platform that matches or otherwise corresponds to the optimal persona.

Figure 1:
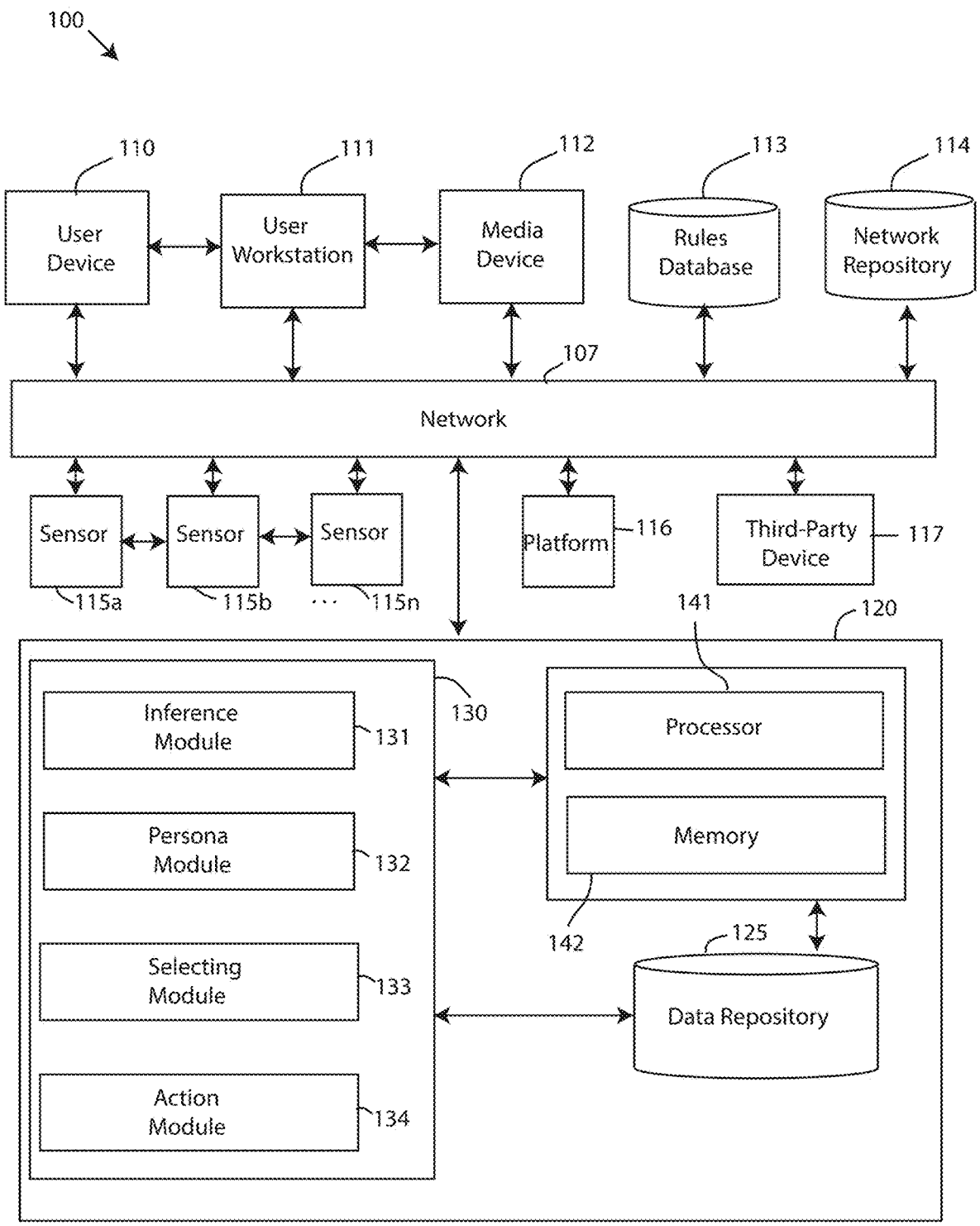
FIG. 1 depicts a block diagram of a user profile selection system, in accordance with embodiments of the present invention.

Referring to the drawings, FIG. 1 depicts a block diagram of user profile selection system 100, in accordance with embodiments of the present invention. The user profile selection system 100 is a system for selecting a user profile for use with a platform based on an optimal persona of the user. The user profile selection system 100 may be useful for selecting a user profile registered with a platform based on an optimal persona of the user that is determined by a context of the user. Embodiments of the user profile selection system 100 may be alternatively referred to a user persona determination system, a profile switching system, a contextual persona selection system, and the like.

The user profile selection system 100 includes a computing system 120. Embodiments of the computing system 120 include a computer system, a computer, a server, one or more servers, a backend computing system, and the like. The computing system 120 may be one or more servers servicing a platform being used by the user.

Furthermore, the user profile selection system 100 includes user device 110, user workstation 111, a media device 112, a rules database 113, a plurality of sensors 115a, 115b . . . 115n, a platform 116, and a third party device 117 that are communicatively coupled to the computing system 120 over a network 107. For instance, information/data is transmitted to and/or received from the user device 110, the user workstation 111, the media device 112, the rules database 113, the sensors 115a, 115b . . . 115n, the platform 116, and the third party device 117 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases, such as network repository 114, which are network repositories containing information of the user preferences, available personas, user profiles, platforms used by the user, etc., network repositories or other systems connected to the network 107 that are considered nodes of the network 107. In an embodiment where the computing system 120 or network repositories allocate resources to be used by the other nodes of the network 107, the computing system 120 and network repository 114 is referred to as servers.

The network-accessible knowledge bases 114 is a data collection area on the network 107 which backs up and save all the data transmitted back and forth between the nodes of the network 107. For example, the network repository is a data center saving and cataloging the user preferences, available personas, user profiles, platforms used by the user, etc., and the like, to generate both historical and predictive reports regarding a particular user. In an exemplary embodiment, a data collection center housing the network repository 114 includes an analytic module capable of analyzing each piece of data being stored by the network repository 114. Further, the computing system 120 can be integrated with or as a part of the data collection center housing the network repository 114. In an alternative embodiment, the network repository 114 is a local repository that is connected to the computing system 120.

The user device 110 is a user computing device. The user computing device can be a computing device, a computer, a desktop computer, a cell phone, a mobile computing device, a tablet computer, a laptop computer, a wearable computing device, a smartwatch, and the like. The user device 110 can include hardware functionality such as a speaker for emitting a sound, a vibration motor for creating vibrations, a GPS sensor for tracking a location of the user device 110, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

The user workstation 111 is a user computing device specifically used for work or professional purposes. The user workstation 111 can be a computing device, a computer, a desktop computer, a cell phone, a mobile computing device, a tablet computer, a laptop computer, and the like. The user workstation 111 can include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like. Further, the user workstation 11 includes a work calendar information and other information relating to the user's job, career, professional responsibilities, duties, files, and the like.

The media device 112 is a device that provides or is used to stream content to a user, such as a streaming media server. The media device 112 is configured to transmit data packets associated with a particular content selected for streaming by a user, to a user device, such as user device 110 for streaming content available on a streaming media service accessible by the media device 112. The media device 112 has access to a content database. The content database is a database or other storage device maintained or otherwise controlled by the streaming media server, which stores data related to streamable content available for streaming by the streaming media server and user account information.

The rules database 113 is a database or other storage device that includes a set of rules for determining which persona corresponds to various contexts of the user. The rules database 113 also stores relationships between the personas and the user profiles for each different platform used by the user.

The sensors 115a, 115b . . . 115n (hereinafter referred to sensors 115) are sensors, input devices, or any input mechanism. For example, sensors 115 may be a biometric sensor, a wearable sensor, an environmental sensor, a camera, a camcorder, a microphone, a peripheral device, a computing device, a mobile computing device, such as a smartphone or tablet, facial recognition sensor, voice capture device, and the like. The sensors 115 collect audio data, such as speech, from an environment. To collect the audio from the environment, the sensors 115 are positioned within an environment occupied by the user, or otherwise disposed in a location that can result in obtaining voice data from a conversation. The collection of audio from a conversation is only done with the knowledge and consent of the user, and can be turned off at any time, thereby respecting the privacy of the and the user and others speaking with the user.

In an exemplary embodiment, one of the sensors 115 is a microphone of a smart mobile phone of user and another sensor is a camera positioned within the environment, such as a car, office, or room within a building or house. Sensors 115 can be two cameras that capture video data of a conversation, including voices, a posture, facial expressions, perspiration, muscle activity, gestures, etc. Sensors 115 can be two microphones positioned nearby the user to collect audio relating to a conversation between speakers and the user. Further sensors 115 that can be used with system 100 include other hardware input devices, such as an audio conversion device, digital camera or camcorder, voice recognition devices, graphics tablet, a webcam, VR equipment, and the like. Sensors 115 also can include a mobile computing device, such as a smartphone or tablet device, which may run various applications that contain data about the user and. For example, a user's smartphone may be used as a sensor, utilizing the device's camera, microphone, and other embedded sensors to send information to the computing system 120. Moreover, embodiments of sensors 115 may encompass other input mechanisms, such as a user computer that may send information to the computing system 120, wherein the user computer may be loaded with software programs that are designed to gather information about the user.

Sensors 115 can include a sensor associated with a vehicle, such as a camera located inside a cabin of the vehicle. Other vehicle sensors, such as weight sensors, optical sensors, environmental sensors, gauges, and the like can transmit data to the computing system 120 over network 107. By way of example, a camera inside of a car can capture video of an individual entering the user's vehicle with the user. Facial recognition software can determine an identity of the individual(s) inside the car and/or entering/exiting the car, such as a spouse, colleague, supervisor, client, children, etc. of the user.

Furthermore, the one or more sensors 115 may be in communication with each other. The sensors 115 interact with each other for collecting comprehensive, accurate, timely, and organized data, and sending to computing system 120. A first sensor of the one or more sensors 15 may request help from another sensor of the one or more sensors 15 to confirm contextual information of the user or a data result from the first sensor. For example, a facial recognition sensor may communicatively interact with a microphone sensor to confirm an identity of a person with the user. Additionally, data received by the computing system 120 that is collected by a first sensor of the one or more sensors 115 may be dependent on another sensor of the one or more sensors 115. For instance, an optical sensor inside a vehicle for detecting objects in the cabin may rely on pressure sensors located within the passenger's seat to confirm a presence of another person with the user. Further, embodiments of the sensors 115 may be synchronized with each other to provide accurate and timely data in combination to the computing system 120. As an example, a smartwatch worn by the user may be synchronized with a smart home thermostat located in the house of the user to cohesively report a location of the user to the computing system 120. Any sensor may communicate with the other sensors. The interactive communication between the sensors 115 may modify, update, augment, bolster, confirm, reference, etc. data received and/or collected by the sensor, as well as improve the accuracy and efficiency of the data.

The platform 116 is a service, software application, vehicle, object, tool, hardware device, and the like, which can be used by the user to perform or request actions. Examples of platform 116 include a social media application, a vehicle infotainment system, a content streaming service, a website, an online retail service, a smart speaker, a satellite radio, a car radio, an in-vehicle system, a smart home suite of connected IoT devices, a gaming console platform, a messaging application, a collaborative software application, a document management platform, a ride sharing application, a location sharing application, an email application, and the like. The platform 116 can be any platform, application, service, tool, website, etc. that is capable of registering user profiles.

The third party device 117 is a computing device owned, operated by, or located on the persons of an individual within a certain proximity to the user. The third party device 117 can be a computing device, a computer, a desktop computer, a cell phone, a mobile computing device, a tablet computer, a laptop computer, a wearable computing device, a smartwatch, and the like, associated with an individual other than the user. The third party device 117 can include hardware functionality such as a speaker for emitting a sound, a vibration motor for creating vibrations, a GPS sensor, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like. The third party device 117 can be configured to share data with the computing system 120 that can be helpful for building a context of the user. The collection of data from third party devices 117 is only done with the knowledge and consent of the third party, and can be turned off at any time, thereby respecting the privacy of the and the third party.

Referring still to FIG. 1, the computing system 120 of the user profile selection system 100 is equipped with a memory device 142 which stores various data/information/code, and a processor 141 for implementing the tasks associated with the user profile selection system 100.

A profile selection application 130 is loaded in the memory device 142 of the computing system 120. The profile selection application 130 can be an interface, an application, a program, a module, or a combination of modules. In an exemplary embodiment, the profile selection application 130 is a software application running on one or more back end servers (e.g. computing system 120), servicing the platform 117 and/or the user device 110. In other embodiments, the profile selection application 130 is a software application running on the user's mobile device 110. In further embodiments, aspects of the profile selection application 130 are loaded onto the computing system 120 and the user mobile device 110 and other devices connected to the computing system 120 over the network 107.

The profile selection application 130 of the computing system 120 inference module 131, a persona module 132, a selecting module 133, and an action module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The inference module 131 includes one or more components of hardware and/or software program code for inferring a context of a user based on data received from a plurality of data sources. For instance, the inference module 131 receives information/data from a plurality of sources to determine a context of the user. The context of the user includes a location of the user, a current time, a company of the user, a sentiment of the company around the user, an identity of the company of the user, a role of the user, an expectation of the user, a responsibility of the user, actions of the user, whether the user is working or not working, whether the user is expected to be at a certain location or meeting, whether the user is driving, flying, walking, running, sitting, whether the user is at home or in public, and the like. Some specific examples of the context being inferred include the user is at a work event, the user driving the user's supervisor to an off-site meeting during work hours, the user's spouse driving with the user to the grocery, the user's children sitting with the user on a couch about to find content to watch in the evening, the user walking home from the user's office after the work day has ended, the user driving into work alone, the user is out at a night club with friends, the user is in a meeting with known professional colleagues. Any number of contexts can be inferred by the inference module 131 based on information received from the plurality of data sources.

The plurality of data sources include the user mobile device 110, the user workstation 111, the media device 112, the sensors 115, the platform 116, and third party devices 117. By way of example, the user mobile device 110 sends GPS location information, time information, personal calendar information, etc. to the computing system 120; the user workstation 111 sends work calendar information based on a connection to a shared work calendar that identifies individuals expected to be in a meeting with the user; the media device 112 can inform the computing system 120 if the user is logged into a streaming media service and currently watching or not watching content; an in-vehicle camera feeds the computing system 120 data about objects and/or people in the user's vehicle; a weight sensor of the passenger seats in the vehicle confirms a presence of one or more individuals in the vehicle with the user; a microphone sends audio data captured from an environment for identifying others nearby the user or if the user alone; the platform 116 provides recent activity information; and the third party device 117 transmits similar information to the user mobile device 110 to further confirm data received by other sources. Other data sources can be used for inferring context, such as the news websites, mobile apps, notifications, user subscriptions, user preferences set on the user mobile device 110, and the like.

The inference module 131 analyzes the data from the data sources and applies one or more data models to discover, identify, interpret and communicate patterns or trends in the data that are helpful in inferring a context of the user. The inference module 131 relies on applications of statistics, computer programming, and the like, of the data collected and received to discover, interpret, and infer context. Moreover, the inference module 131 leverages various tools to analyze the data received from the sources, such as a voice analyzer, an image recognition engine, natural language processing techniques, artificial intelligence models, deep learning models, neural networks, various algorithm and computer processes, and the like.

The persona module 132 includes one or more components of hardware and/or software program code for determining a persona of the user according to the context of the user. The persona of the user refers to an aspect of the user's character or an aspect of a fictitious person's character that is intentionally presented to others in an attempt to convey a certain perception of the user in a given situation or in a specific context. Examples of persona include a work persona, a casual persona, a private persona, a careful persona, a reserved persona, a professional persona, a carefree persona, a fun persona, a funny persona, an energetic persona, a genuine persona, a relaxed persona, an enlightened persona, and the like. The persona module 132 determines which persona is optimal or desired according to the context of the user. An optimal or ideal persona is a persona that would benefit, oblige, or satisfy the user in a personal or professional capacity with respect to how another person perceives the user. The optimal or ideal persona could also be a persona of the user that benefits, obliges, or satisfies others in the company of the user.

The optimal or ideal persona is determined by applying a set of rules that govern a selection of the persona according to the context of the user. The rules are stored in the rules database 113 and accessed by the persona module 132. The rules are programmed according to which persona the user desires to showcase in given situations. For example, the user may wish to: showcase a work persona in all situations where the user's "boss" is present; showcase a private persona in all situations where the user is with friends; showcase a genuine persona in all situations where the user is alone; or showcase a relaxed persona in all situations where the user is driving the user's convertible. In further examples, the user may wish to: showcase a work persona when using social media applications between the hours of 9:00 AM-5:00 PM and showcase a genuine persona when using social media applications after 5:00 PM; showcase a casual persona when the user is with the user's spouse during the evening; showcase an energetic persona in situations where the user is alone and exercising in the user's home, but showcase a reserved persona where the user is exercising at a gym; and showcase a professional persona in situations where the user is having lunch with a work colleague. The set of rules are updated over time using a cognitive learning model that learns the user's preferences over time in various contexts.

Figure 2:
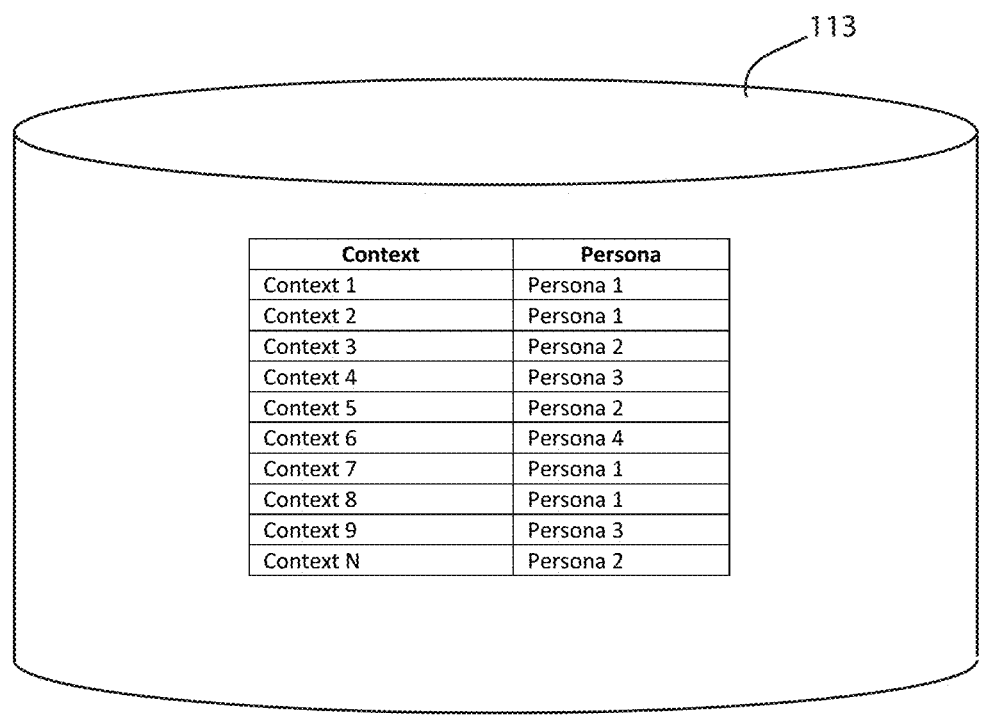
FIG. 2 depicts an example of a database having a data table for determining a persona for a given context, according to the embodiments of the present invention

The rules database 113 stores the rules to be applied for determining which persona should be showcased in a given context. FIG. 2 depicts an example of a database having a data table for determining a persona for a given context, according to the embodiments of the present invention. In the illustrated table, each context (e.g. Context 1, 2, 3 . . . N) is associated with a persona. The persona module 132 accesses the rules database 113 and locates the context or the closest context stored in the database 113 and then identifies the persona associated with the identified context of the user. For example, if the context of the user is Context 1, the persona module 132 determines that the desired persona to showcase in this context is Persona 1. The persona module 132 determines which persona to select from a plurality of personas, such as Persona 1, 2, 3 . . . N. The rule-based algorithm used by the persona module 132 allows the desired persona to be accurately selected for different contexts of the user. Moreover, the number of contexts stored in the database 113 grows over time as new contexts are inferred by the inference module 131. As new contexts are updated and stored in the rules database 113, the persona module 132 updates the database 113 with a corresponding persona. The persona module 132 assigns a persona according to existing rules, or the user can be notified of the new context and the persona module 132 will assign the persona to the new context as instructed by the user.

Referring still to FIG. 1, the selecting module 133 includes one or more components of hardware and/or software program code for selecting a user profile associated with a platform 116 that corresponds to the persona, in response to detecting that the user is accessing the platform 116. For instance, the selecting module 133 selects a specific user profile registered or linked with a specific platform that the user is attempting to use. The user profile is a user ID, profile, user account, user tag, and the like, that is specific to each platform 116. User profiles are created by the user or automatically configured by the platform 116 and linked to the computing system 120. The user profiles are created with preferences and rules for operation of the platform 116 consistent with a specific persona. As the user is accessing the platform 116, the selecting module 133 accesses the rules database 113 to determine which user profile to select and then instructs the platform 116 to load the selected user profile. Alternatively, the selecting module 133 sends a notification to the user with the selected user profile and requests the user confirm the selection of the user profile or input a different user profile.

Figure 3:
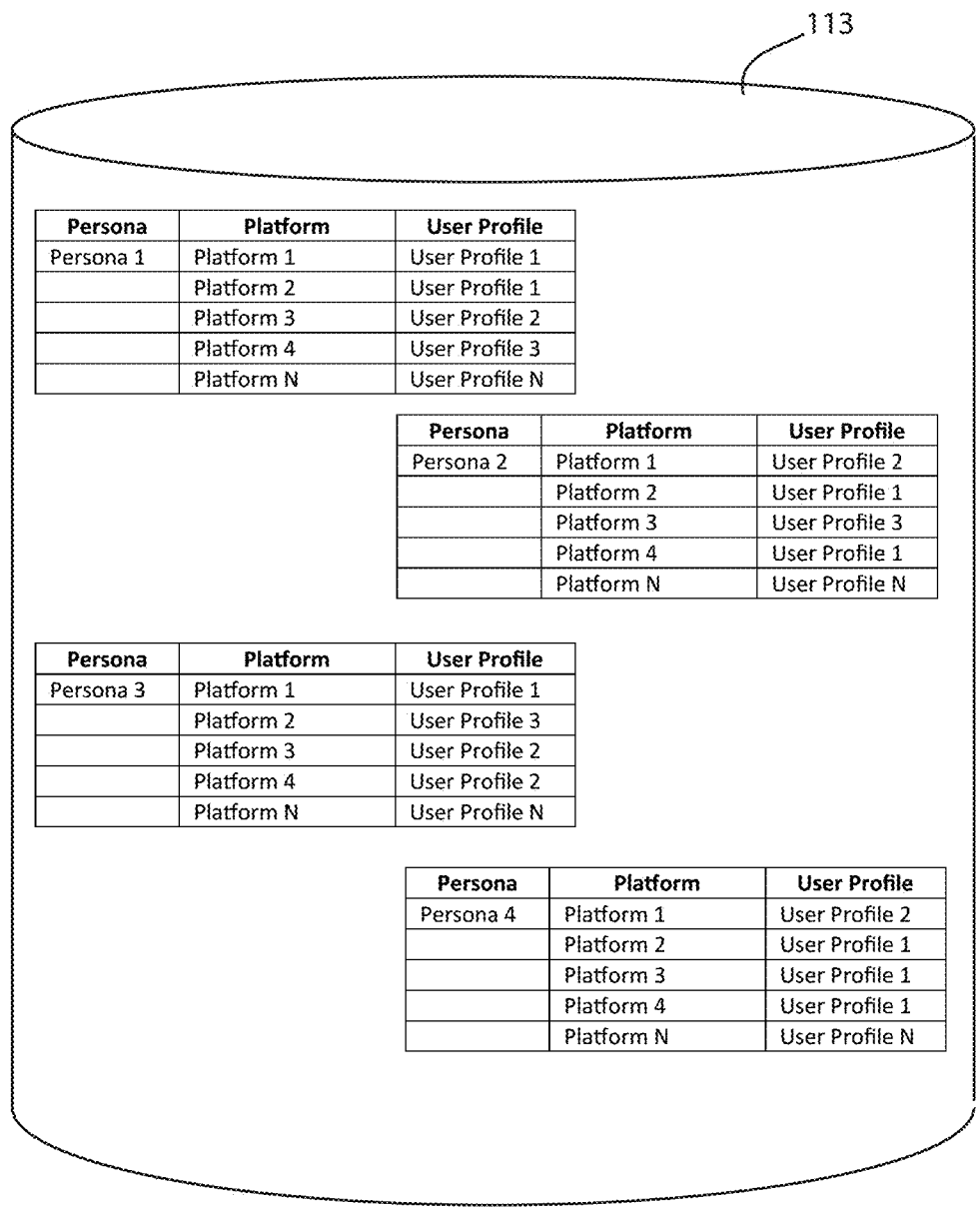
FIG. 3 depicts an example of a database having a data table for determining a user profile for a given platform and a given persona, according to the embodiments of the present invention.

The rules database 113 stores the rules to be applied for determining which user profile to select for a specific platform 116 and a specific persona. FIG. 3 depicts an example of a database having a data table for determining a user profile for a given platform and a given persona, according to the embodiments of the present invention. In the illustrated table, each persona (e.g. Persona 1, 2, 3 . . . N) includes instructions for selecting a user profile (e.g. User Profile 1, 2, 3 . . . N) for each platform (e.g. Platform 1, 2, 3 . . . N registered with the computing system 120. The selecting module 133 accesses the rules database 113 and locates the optimal persona stored in the database 113, identifies the platform being accessed for use by the user, and then identifies the user profile associated with the optimal persona. For example, if the optimal persona is determined to be Persona 2 and the user is accessing Platform 3, the selecting module 133 determines that the user profile that should be used during operation of the platform is User Profile 3. The selecting module 133 determines which persona to select from a plurality of user profiles registered with a given platform 116. User Profile 1 registered with Platform 1 is different than User Profile 1 registered with Platform 2. The rule-based algorithm used by the selecting module 133 allows the appropriate user profile to be accurately selected for different personas of the user. Moreover, the number of platforms and user profiles stored in the database 113 grows over time as new platforms are added and new user profiles are created.

Referring back to FIG. 1, the action module 134 includes one or more components of hardware and/or software program code for performing an action in accordance with the persona of the user. For instance, the action module 134 may switch a user profile from a current user profile to the user profile selected based on the persona of the user, as a function of the selecting the user profile. If the current user profile, or last used user profile, for the platform 116 is inconsistent with the user profile selected based on the persona of the user, the action module 134 automatically switches to the new user profile. Alternatively, the action module 134 prompts the user to accept a switch from the current profile to the desired user profile consistent with the persona of the user; the action module 134 switches the user profile in response to a user input based on a notification sent to the user via the platform.

Furthermore, the action module 134 may disable one or more features of the platform 116 based on the user profile selected based on the persona. By way of example, if the user launches a location-sharing software application, the action module 134 disables the location sharing feature to specific individuals based on the persona of the user. Conversely, the action module 134 may enable one or more features of the platform based on the user profile selected based on the persona. If the persona of the user changes while the user is still using the location-sharing application, the action module 134 enables the previously disabled location sharing the individuals previously not receiving the location information. In another example, if the user launches an internet radio application, the action module 134 may disable all channels relating to politics based on the persona of the user, and if the persona of the user changes, the action module 134 may automatically enable the channels relating to politics. The change of the persona of the user occurs if the action module 134 detects a change in the context of the user and the change in context warrants an update to the current persona of the user. If the change in context is detected, the action module 134 consults the rules database 113 as described supra and determines an updated persona according to the change in the context of the user. A new user profile is then selected based on the updated persona.

The action module 134 may also augment a user interface of the platform 116 based on the selected user profile consistent with the persona of the user. By way of example, if the user launches a content streaming application, the user interface displaying various titles is augmented to show only titles rated PG-13 if the persona is a reserved persona. In another example, if the user launches an electronic book application, a library user interface of available books is augmented to display only award winning books if the persona is an enlightened persona.

Figure 4:
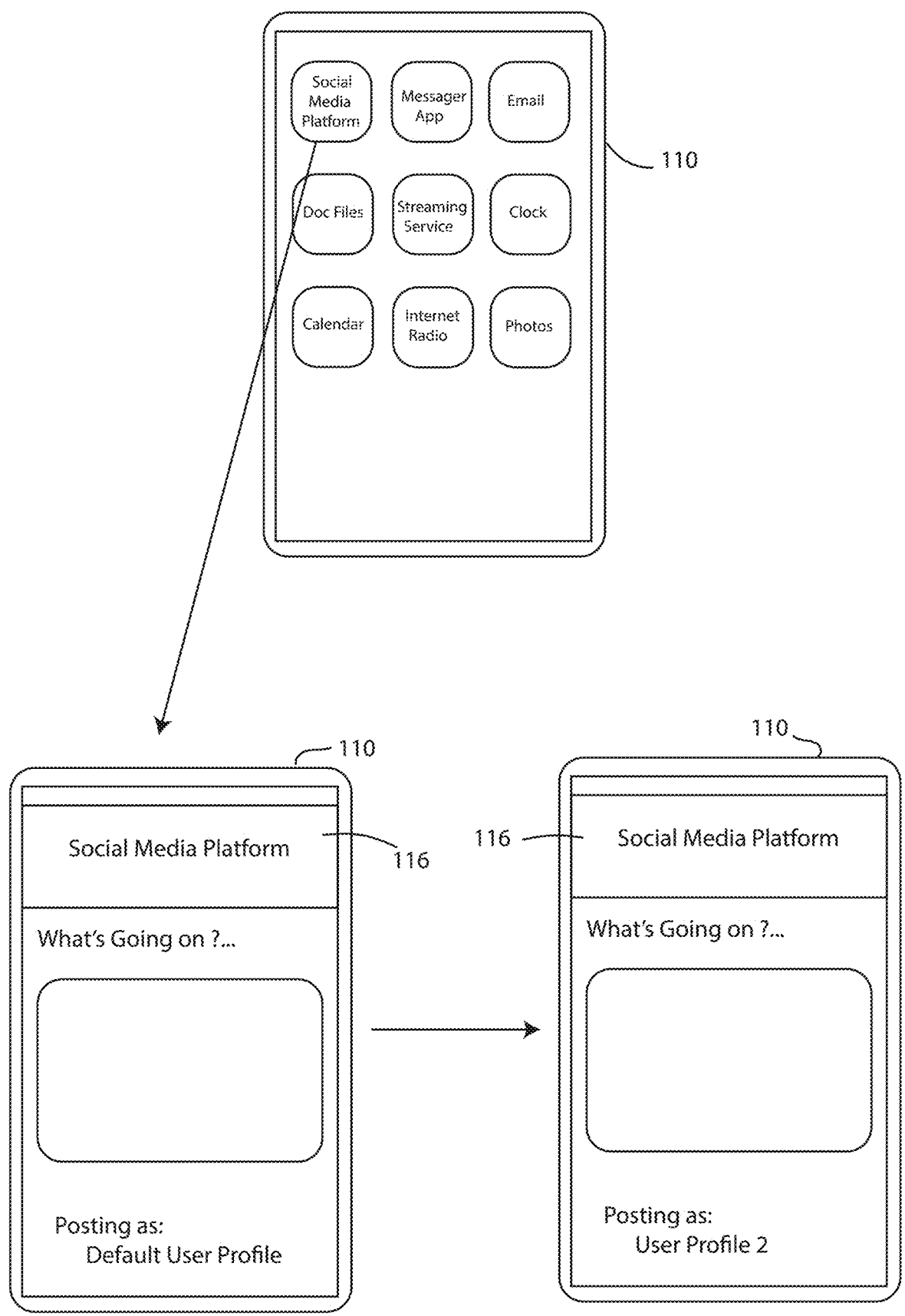
FIG. 4 depicts a use of a social media application, in which a default user profile is switched to a new user profile based on the persona of the user, in accordance with embodiments of the present invention.

An exemplary embodiment of the system 100 will now be described with reference to FIG. 4. FIG. 4 depicts a use of a social media application, in which a default user profile is switched to a new user profile based on the persona of the user, in accordance with embodiments of the present invention. In the illustrated embodiment, a social media platform application loaded on the user mobile device 110 is opened by the user. The profile selection application 130 of the computing system 120 responds to the opening of the social media platform by determining that the persona of the user is a work persona because the social media application was opened at 11:30 AM on Tuesday, the user's location was at the user's office, and the user's work calendar indicates that the user has an in-person meeting with a client at the office in the next fifteen minutes. Based on the determined work persona, the profile selection application 130 switches the user profiles from "Default User Profile" to "User Profile 2." User Profile 2 is a work account of the user so that posts by the user using the social media application are visible on the social media application as coming from the user in a work or job-related capacity. For instance, the details of the post include the user's job title and company information, as opposed to the user's personal information. In this way, the user does not need to remember to switch between the user's personal account and the user's work account, based on the context of the user being in a "work mode." The user interface of the social media platform is also augmented to indicate to the user that the user profile has been changed (i.e "Posting as: User Profile 2).

Figure 5:
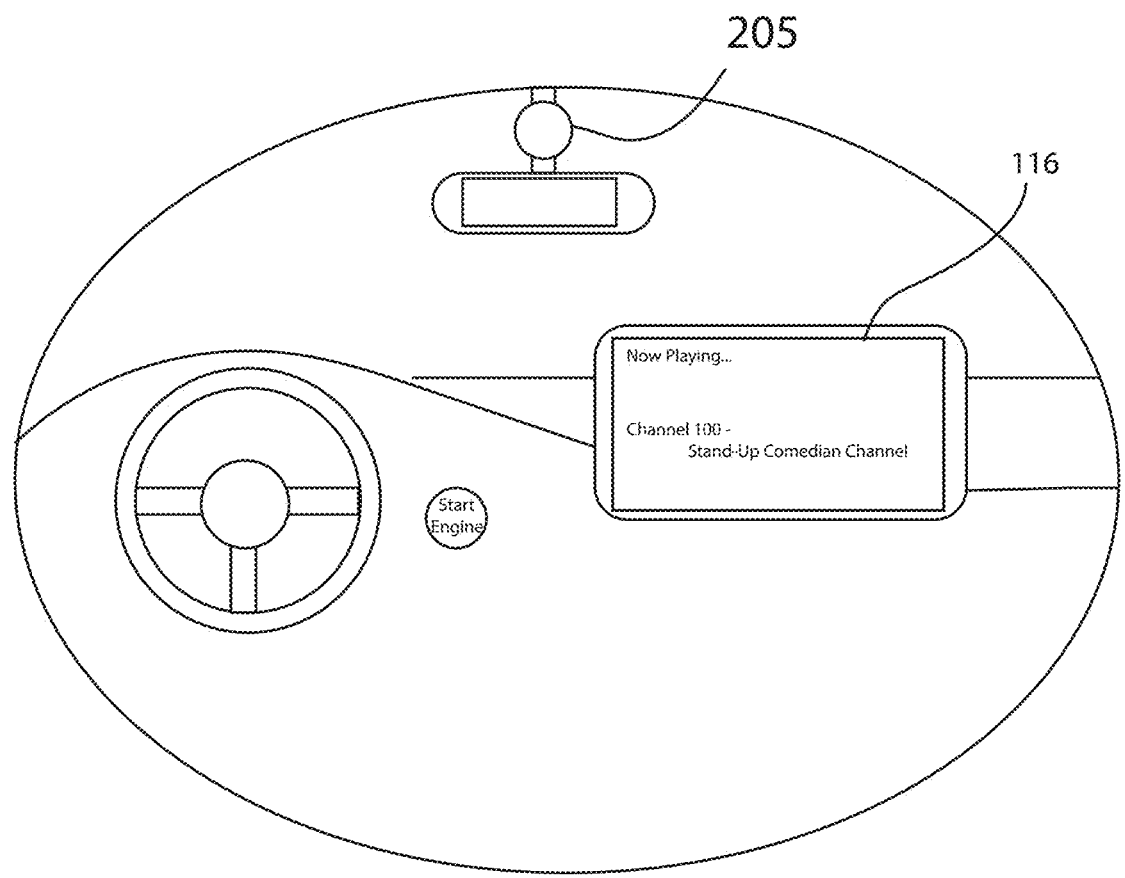
FIG. 5 depicts a use of a car infotainment system, in which a current satellite radio channel is playing, in accordance with embodiments of the present invention.
Figure 6:
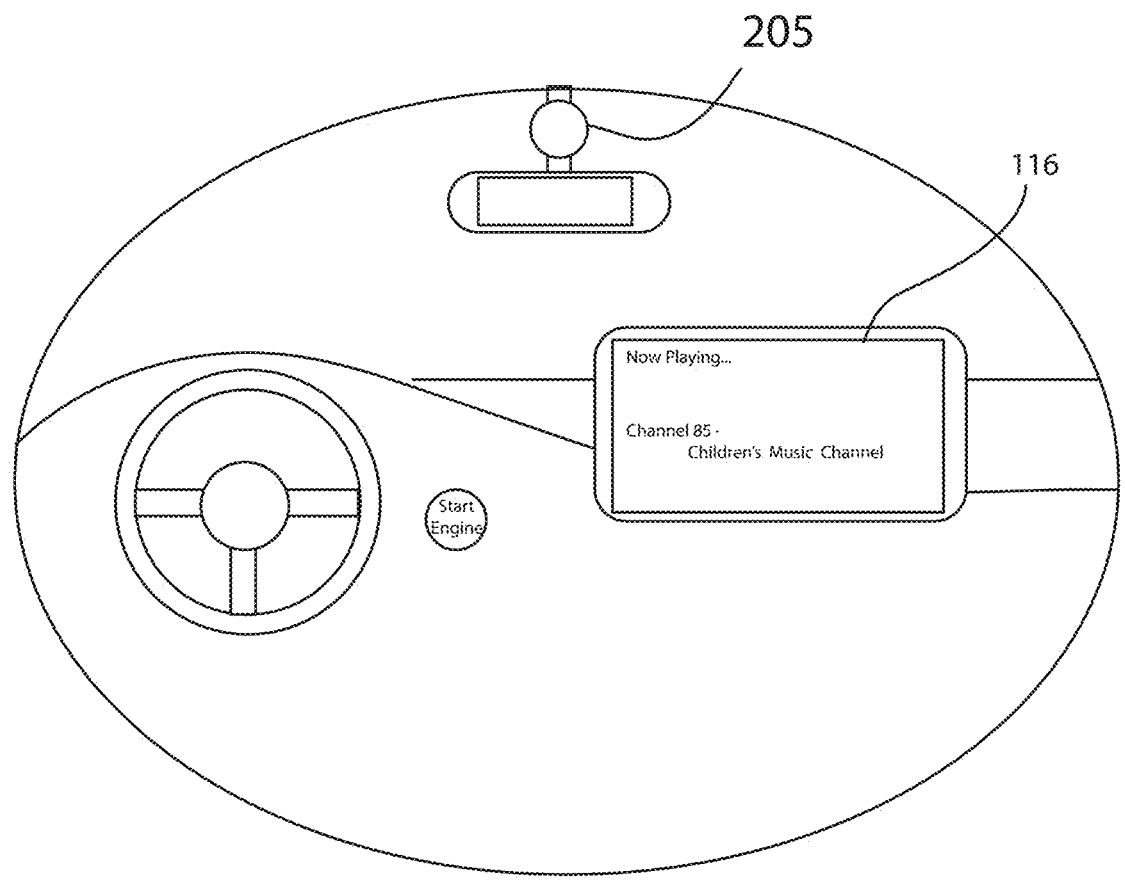
FIG. 6 depicts a use of the car infotainment system, in which the satellite radio channel of FIG. 5 is changed to a new satellite radio channel based on the persona of the user, in accordance with embodiments of the present invention.

Another exemplary embodiment of the system 100 will now be described with reference to FIGS. 5-6. FIG. 5 depicts a use of a car infotainment system, in which a current satellite radio channel is playing, in accordance with embodiments of the present invention. In the illustrated embodiment, the user is in the car alone driving to pick up the user's children from daycare, as detected by an in-vehicle camera 205 and confirmed by a reminder application on the user's mobile device to pick the user's children from daycare at 3:15 PM. The profile selection application 130 already has selected a user profile that allows the satellite radio of the car infotainment system to play "Channel 100—Stand-Up Comedian Channel," which is currently playing for the user. The user profile selected in FIG. 5 is based on a fun persona of the user. FIG. 6 depicts a use of the car infotainment system, in which the satellite radio channel of FIG. 5 is changed to a new satellite radio channel based on the persona of the user, in accordance with embodiments of the present invention. In the illustrated embodiment, the satellite radio channel has been automatically changed to "Channel 85—Children's Music Channel" because the user's children have entered the user's car as detected by the in-vehicle camera 205. Because the user's children have entered the car, the context of the user has changed and the persona of the user changes from a fun persona to a reserved person.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the user profile selection system 100 uses specific rules to determine an optimal persona of the user. The specific rules are applied to various contexts to dictate which user persona should be showcased at current moment in time. The rules are unique and tailored to the user. Further, the rules based logic of the system 100 allows different user profiles registered with different platforms that are unique to each platform to be selected consistent with a single persona of the user. The user profile selection system 100 provides a technical solution to the above-drawbacks by controlling content output by various platforms based on a set of rules pertaining to a persona unique to the user. The technical solution(s) described herein is necessarily rooted in computer technology in order to overcome a problem specifically arising in the realm of multiple user profiles for a single platform, based on a set of rules applied by the computing system 120. For instance, without the user profile selection system 100, a user must remember to switch between multiple user profiles when using the platform. The user profile selection system 100 automatically applies rules that modify or otherwise augment the platforms.

Figure 7:
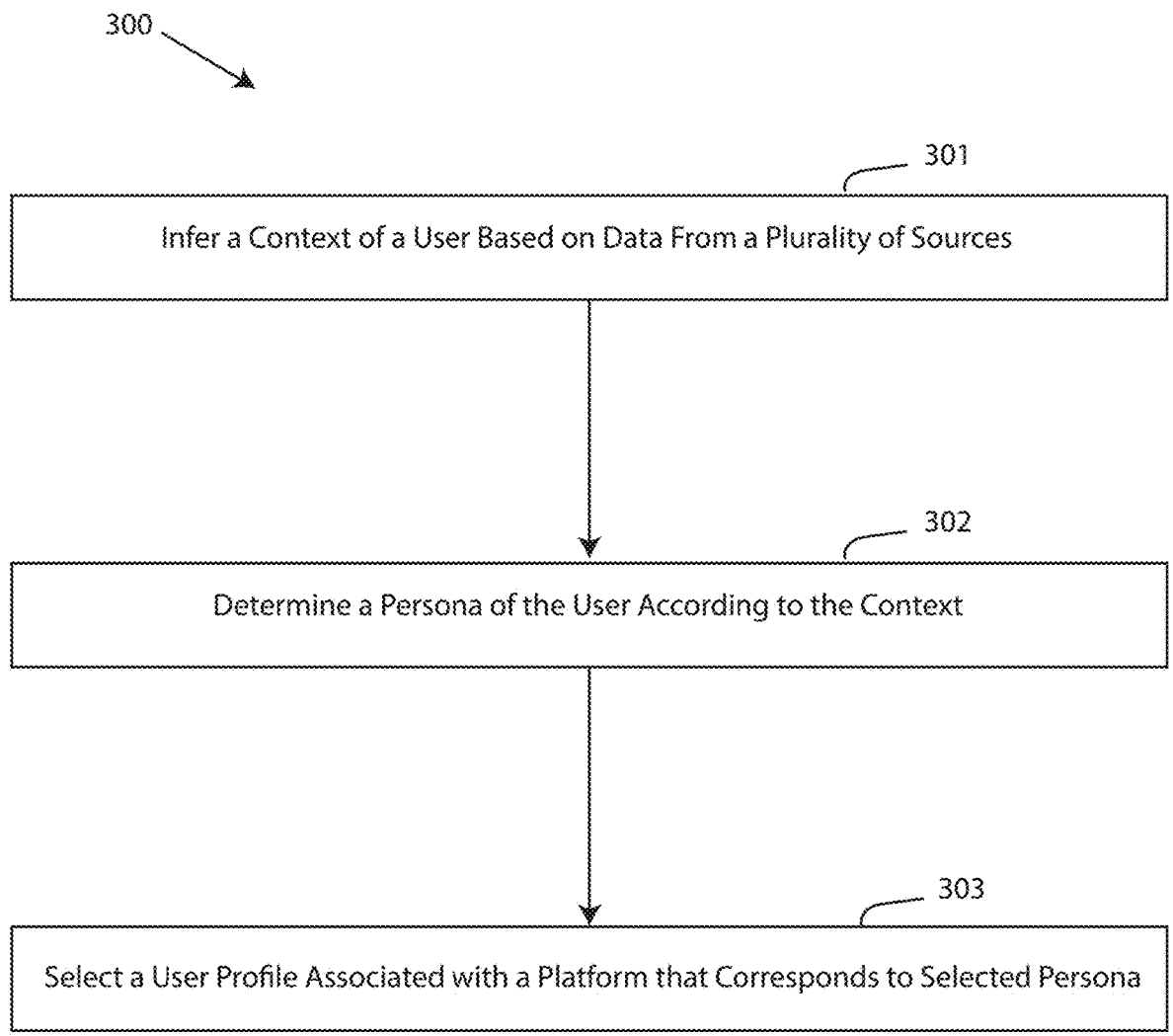
FIG. 7 depicts a flow chart of a method for selecting a user profile for use with a platform based on an optimal persona of the user, in accordance with embodiments of the present invention.

Referring now to FIG. 7, which depicts a flow chart of a method 300 for selecting a user profile for use with a platform based on an optimal persona of the user, in accordance with embodiments of the present invention. One embodiment of a method 300 or algorithm that may be implemented for selecting a user profile for use with a platform based on an optimal persona of the user with the user profile selection system 100 described in FIGS. 1-6 using one or more computer systems as defined generically in FIG. 9 below, and more specifically by the specific embodiments of FIG. 1.

Embodiments of the method 300 for selecting a user profile for use with a platform based on an optimal persona of the user, in accordance with embodiments of the present invention, may begin at step 301 wherein step 301 infers a context of a user based on data from a plurality of sources. Step 302 determines a persona of the user according to the context. Step 303 selects a user profile associated with a platform that corresponds to the selected persona.

Figure 8:
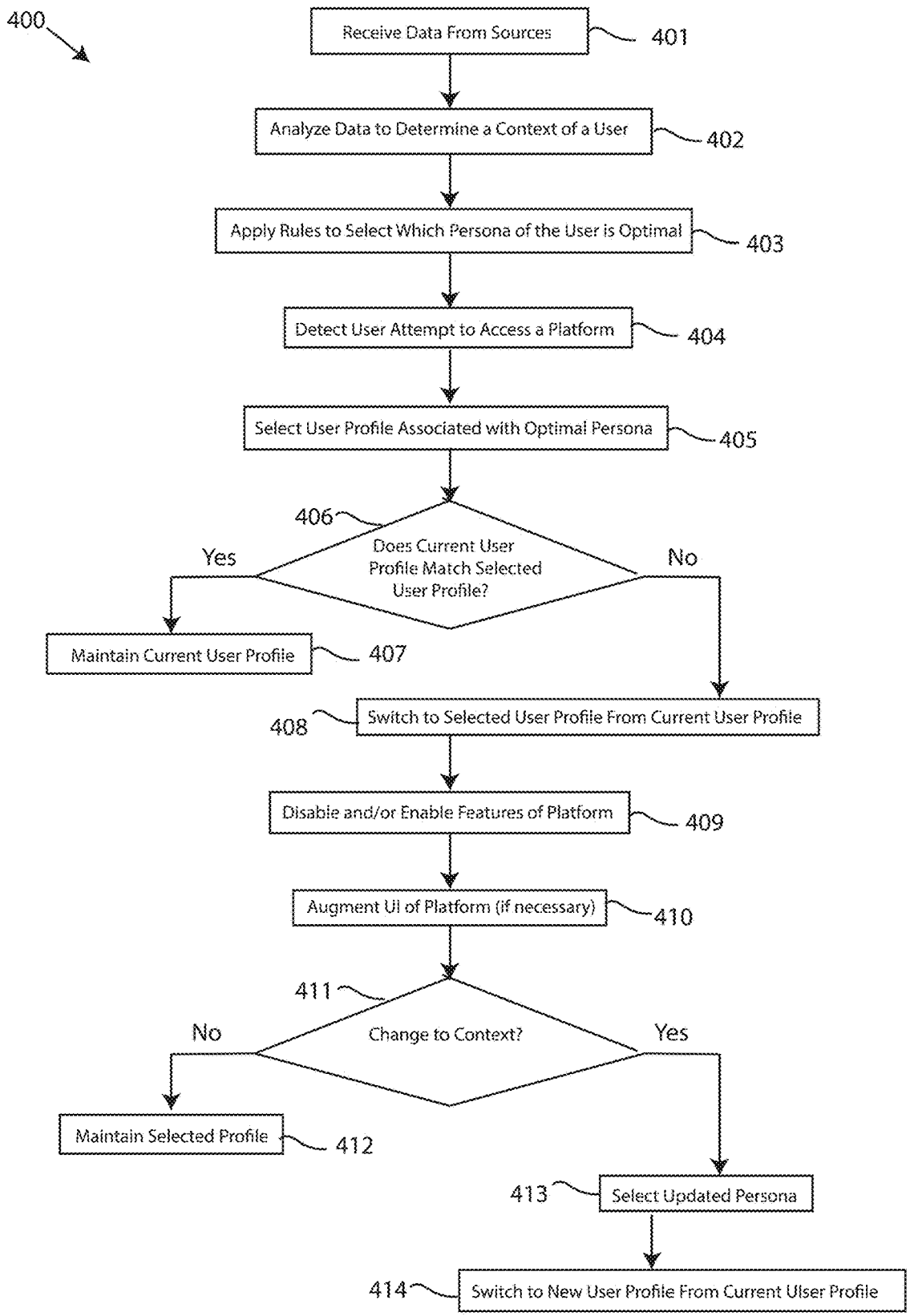
FIG. 8 depicts a detailed flow chart for selecting a user profile for use with a platform based on an optimal persona of the user, in accordance with embodiments of the present invention.

FIG. 8 depicts a detailed flow chart of a method 400 for selecting a user profile for use with a platform based on an optimal persona of the user, in accordance with embodiments of the present invention. Step 401 receives data from one or more sources. Step 402 analyzes the received data to determine a context of the user. Step 403 applies rules to select which persona of the user is optimal in accordance with the current context of the user. Step 404 detects a user attempt to access a platform. Step 405 selects the user profile associated with the optimal persona of the user. Step 406 determines whether the current user profile (e.g. last used profile) matches the user profile selected based on the optimal persona of the user. If yes, step 407 maintains the current user profile. If no, step 408 switches from the current user profile to the user profile selected based on the persona of the user. Step 409 disables and/or enables features of the platform in accordance with the user profile/persona of the user. Step 410 potentially augments the user interface of the platform in accordance with the settings of the user profile selected based on the optimal persona of the user. Step 411 determines whether a change to the context of the user has occurred. If no, step 412 maintains the selected user profile. If yes, step 413 selects the updated persona and step 414 switches to the new user profile from the current user profile.

Figure 9:
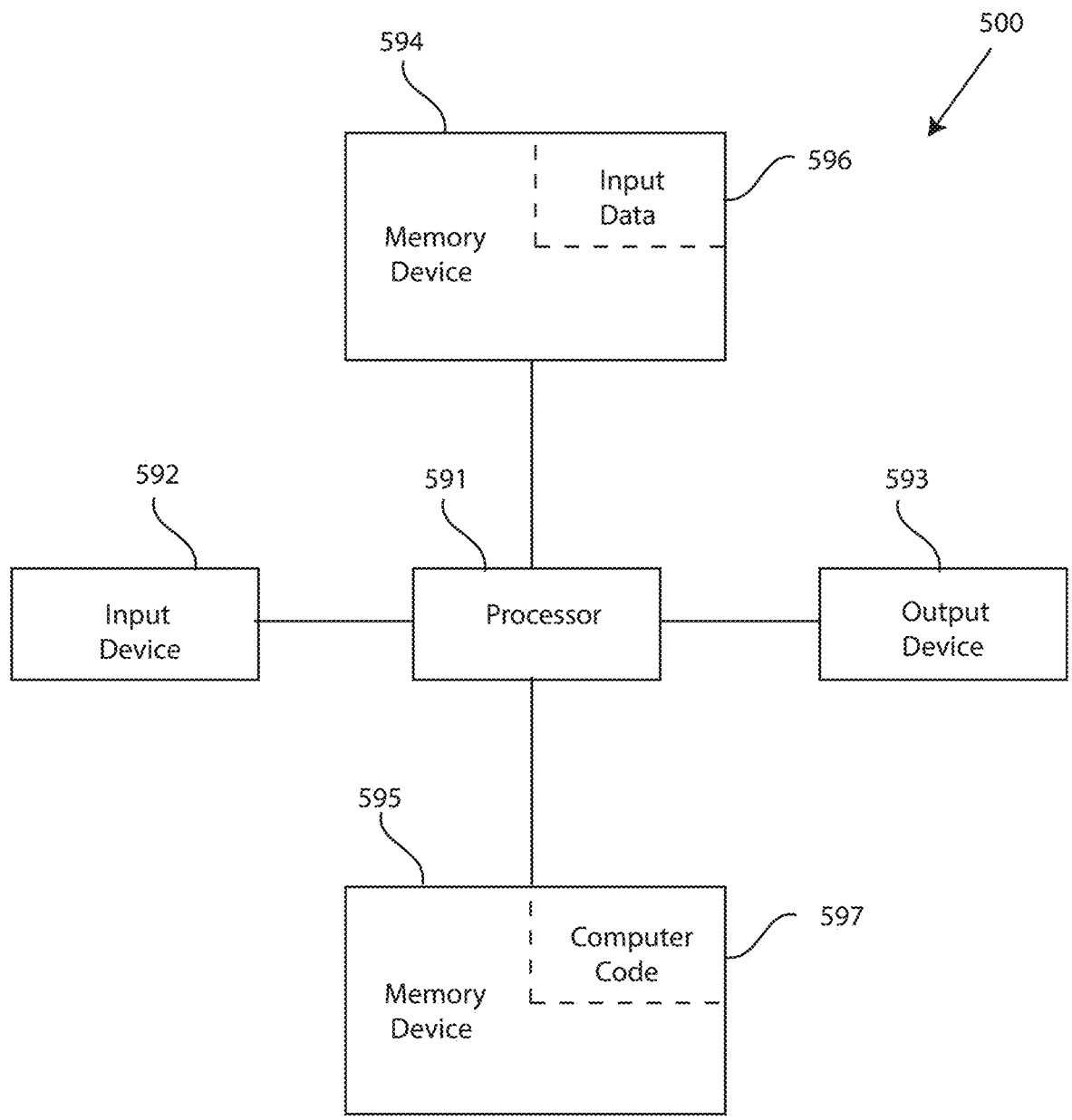
FIG. 9 depicts a block diagram of a computer system for user profile selection system of FIGS. 1-6, capable of implementing a for selecting a user profile for use with a platform based on an optimal persona of the user of FIGS. 7-8, in accordance with embodiments of the present invention.

FIG. 9 depicts a block diagram of a computer system for the user profile selection system 100 of FIGS. 1-6, capable of implementing methods for selecting a user profile for use with a platform based on an optimal persona of the user of FIGS. 7-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for selecting a user profile for use with a platform based on an optimal persona of the user in the manner prescribed by the embodiments of FIGS. 7-8 using the user profile selection system 100 of FIGS. 1-6, wherein the instructions of the computer code 597 may be executed by processor 591 via memory device 595. The computer code 597 may include software or program instructions that may implement one or more algorithms for implementing the method for selecting a user profile for use with a platform based on an optimal persona of the user, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to selecting a user profile for use with a platform based on an optimal persona of the user. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to select a user profile for use with a platform based on an optimal persona of the user. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for selecting a user profile for use with a platform based on an optimal persona of the user. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for selecting a user profile for use with a platform based on an optimal persona of the user.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
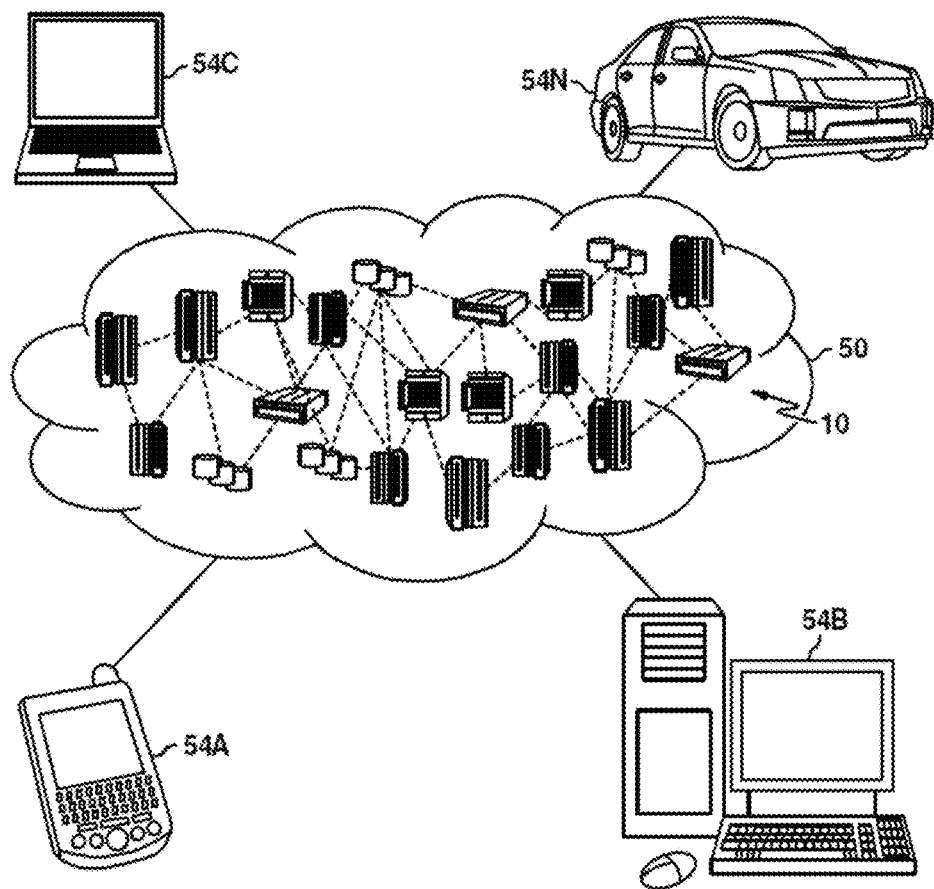
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
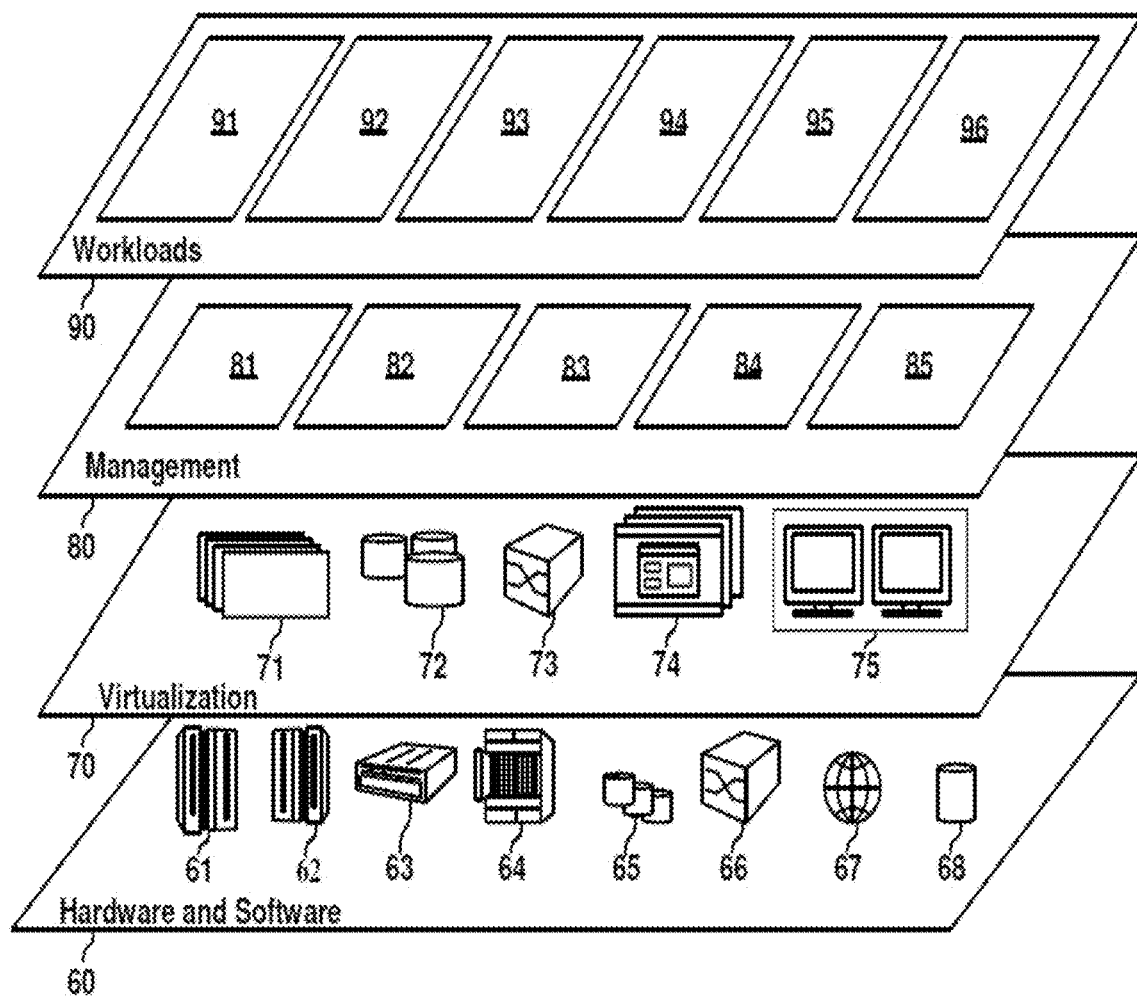
FIG. 11 depicts abstraction model layers, in accordance with embodiments of the present invention.

Referring now to FIG. 11, a set of functional abstraction layers provided by cloud computing environment 50 (see FIG. 10) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93, data analytics processing 94; transaction processing 95; and GUI and user profile selection 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

The invention claimed is:

1. A method comprising:

inferring, by a processor of a computing system, a context of a user based on data received from a plurality of data sources, the user being a driver of a vehicle, the context including a company of the user, the plurality of data sources including a mobile device of the user, a camera of the vehicle and at least one vehicle sensor, wherein the inferring includes confirming the context of the user using at least two of the plurality of data sources;

determining, by the processor, a persona of the user according to the context of the user from a plurality of user personas of the user;

selecting, by the processor, a user profile stored on an infotainment system of the vehicle based on the persona of the user;

displaying, by the processor, a first content on a graphical user interface of the infotainment system associated with the user profile;

detecting, by the processor, a change in the company of the user within the vehicle based on the data provided to the computing system from the camera and the at least one vehicle sensor, and in response to the detecting of the change in the company of the user within the vehicle, deciding on an updated persona of the user according to the change in the company of the user within the vehicle;

selecting, by the processor, a new user profile associated with the user stored on the infotainment system of the vehicle based on the updated persona of the user according to the change in the company of the user within the vehicle, wherein a notification is sent to the user with the selected new user profile requesting the user to confirm the selected new user profile or alternatively requesting manual input of another preferred user profile by the user to appease the change in the company of the user within the vehicle;

enabling or disabling, by the processor, one or more features of the infotainment system as a function of the selecting the new user profile; and augmenting, by the processor, the graphical user interface of the infotainment system to display a second content associated with the new user profile, the second content being different than the first content.

2. The method of claim 1, wherein the determining the persona includes: applying a set of rules that govern a selection of the persona to the context of the user, the set of rules being updated over time using a cognitive learning model.

3. The method of claim 1, further comprising:

switching, by the processor, from a current user profile to the user profile selected based on the persona of the user, as a function of the selecting the user profile.

4. The method of claim 1, wherein the company is a passenger of the user located within the vehicle.

5. The method of claim 4, wherein the change in the company of the user is at least one: the passenger existing the vehicle and a new passenger entering the vehicle.

6. The method of claim 1, wherein, in response to selecting the new user profile, a radio or satellite channel is changed from a current channel to a new channel.

7. A computing system, comprising:

a processor;

a memory device coupled to the processor; and a computer readable storage device coupled to the processor, wherein the storage device contains program code executable by the processor via the memory device to implement a method comprising:

inferring, by the processor, a context of a user based on data received from a plurality of data sources, the user being a driver of a vehicle, the context including a company of the user, the plurality of data sources including a mobile device of the user, a camera of the vehicle and at least one vehicle sensor, wherein the inferring includes confirming the context of the user using at least two of the plurality of data sources;

determining, by the processor, a persona of the user according to the context of the user from a plurality of user personas of the user;

selecting, by the processor, a user profile stored on an infotainment system of the vehicle based on the persona of the user;

displaying, by the processor, a first content on a graphical user interface of the infotainment system associated with the user profile;

detecting, by the processor, a change in the company of the user within the vehicle based on the data provided to the computing system from the camera and the at least one vehicle sensor, and in response to the detecting of the change in the company of the user within the vehicle, deciding on an updated persona of the user according to the change in the company of the user within the vehicle;

selecting, by the processor, a new user profile associated with the user stored on the infotainment system of the vehicle based on the updated persona of the user according to the change in the company of the user within the vehicle, wherein a notification is sent to the user with the selected new user profile requesting the user to confirm the selected new user profile or alternatively requesting manual input of another preferred user profile by the user to appease the change in the company of the user within the vehicle;

enabling or disabling, by the processor, one or more features of the infotainment system as a function of the selecting the new user profile; and augmenting, by the processor, the graphical user interface of the infotainment system to display a second content associated with the new user profile, the second content being different than the first content.

8. The computer system of claim 7, wherein the determining the persona includes: applying a set of rules that govern a selection of the persona to the context of the user, the set of rules being updated over time using a cognitive learning model.

9. The computer system of claim 7, further comprising:

switching, by the processor, from a current user profile to the user profile selected based on the persona of the user, as a function of the selecting the user profile.

10. A computer program product, comprising a computer readable hardware storage device storing a computer readable program code, the compute readable program code comprising an algorithm that when executed by a computer processor of a computing system implements a method comprising:

inferring, by the processor, a context of a user based on data received from a plurality of data sources, the user being a driver of a vehicle, the context including a company of the user, the plurality of data sources including a mobile device of the user, a camera of the vehicle and at least one vehicle sensor, wherein the inferring includes confirming the context of the user using at least two of the plurality of data sources;

determining, by the processor, a persona of the user according to the context of the user from a plurality of user personas of the user;

selecting, by the processor, a user profile stored on an infotainment system of the vehicle based on the persona of the user;

displaying, by the processor, a first content on a graphical user interface of the infotainment system associated with the user profile;

detecting, by the processor, a change in the company of the user within the vehicle based on the data provided to the computing system from the camera and the at least one vehicle sensor, and in response to the detecting of the change in the company of the user within the vehicle, deciding on an updated persona of the user according to the change in the company of the user within the vehicle;

selecting, by the processor, a new user profile associated with the user stored on the infotainment system of the vehicle based on the updated persona of the user according to the change in the company of the user within the vehicle, wherein a notification is sent to the user with the selected new user profile requesting the user to confirm the selected new user profile or alternatively requesting manual input of another preferred user profile by the user to appease the change in the company of the user within the vehicle;

enabling or disabling, by the processor, one or more features of the infotainment system as a function of the selecting the new user profile; and augmenting, by the processor, the graphical user interface of the infotainment system to display a second content associated with the new user profile, the second content being different than the first content.

11. The computer program product of claim 10, wherein the determining the persona includes: applying a set of rules that govern a selection of the persona to the context of the user, the set of rules being updated over time using a cognitive learning model.

12. The computer program product of claim 10, further comprising:

switching, by the processor, from a current user profile to the user profile selected based on the persona of the user, as a function of the selecting the user profile.

* * * * *